(12) United States Patent
Begin et al.

(10) Patent No.: US 8,333,548 B2
(45) Date of Patent: Dec. 18, 2012

(54) TURBOMACHINE WITH A LONG LASTING POSITION-HOLDING SYSTEM

(75) Inventors: Valérie Begin, Vernon (FR); Frédéric Boudehen, Le Havre (FR); François Danguy, Tourny (FR); Manuel Frocot, Vernon (FR)

(73) Assignee: Snecma, Paris (FR)

( * ) Notice: Subject to any disclaimer, the term of this patent is extended or adjusted under 35 U.S.C. 154(b) by 679 days.

(21) Appl. No.: 12/485,304

(22) Filed: Jun. 16, 2009

(65) Prior Publication Data

US 2009/0311089 A1 Dec. 17, 2009

(30) Foreign Application Priority Data

Jun. 17, 2008 (FR) ...................................... 08 53977

(51) Int. Cl.
*F01D 3/00* (2006.01)
(52) U.S. Cl. ..................... 415/106; 415/107; 417/423.12
(58) Field of Classification Search .................. 415/104, 415/106, 107, 111, 112; 417/424.1, 423.12, 417/423.14, 365, 369
See application file for complete search history.

(56) References Cited

U.S. PATENT DOCUMENTS

| | | | | |
|---|---|---|---|---|
| 3,570,191 A | * | 3/1971 | Williams | 451/294 |
| 4,740,711 A | | 4/1988 | Sato et al. | |
| 5,209,650 A | * | 5/1993 | Lemieux | 417/356 |
| 5,591,016 A | | 1/1997 | Kubota et al. | |
| 5,803,708 A | | 9/1998 | Mouri et al. | |
| 6,012,898 A | * | 1/2000 | Nakamura et al. | 415/107 |
| 6,036,435 A | * | 3/2000 | Oklejas | 415/111 |
| 2006/0186671 A1 | | 8/2006 | Honda et al. | |

FOREIGN PATENT DOCUMENTS

| | | |
|---|---|---|
| EP | 0355796 | 2/1990 |
| EP | 0784156 | 7/1997 |
| JP | 10252755 A * | 9/1998 |

OTHER PUBLICATIONS

"Modern submersible pumps for cryogenic liquids," World Pumps, Elsevier, Oxford, GB, No. 328, Jan. 1994, p. 23-25.

* cited by examiner

*Primary Examiner* — Edward Look
*Assistant Examiner* — Adam W Brown
(74) *Attorney, Agent, or Firm* — Weingarten, Schurgin, Gagnebin & Lebovici LLP (57) ABSTRACT

A turbomachine arranged with a rotor and a stator, including a radial positioning device ensuring that the rotor is radially positioned; and a contactless axial balancing device arranged on at least one bladed wheel for axially balancing the rotor at high speed. The turbomachine includes a thrust bearing distinct from the radial positioning device serving to balance the rotor axially at low speed, and without contact at high speed. In addition, the radial positioning device is constituted by hydrostatic bearings, the turbomachine including hydrostatic bearing feed circuits suitable for connecting the bearings to a source of fluid under pressure. As a result, it is possible to obtain operation at high speeds with a very long lifetime.

20 Claims, 5 Drawing Sheets

TURBOMACHINE WITH A LONG LASTING POSITION-HOLDING SYSTEM

FIELD OF THE INVENTION

The present invention relates to a turbomachine arranged with a rotor and a stator, and more particularly the invention relates to an improvement to its means for holding the rotor in position relative to the stator.

The turbomachine comprises a fluid-flow portion and an electrical portion that co-operate to enable energy to be exchanged between a fluid flowing through the machine and an electrical circuit.

This exchange may take place in either direction: thus, such a turbomachine may be a compressor, having an electric motor as its electrical portion that drives a fluid-flow portion such as a pump; it may also be an electricity generator, the fluid-flow portion being a turbine that drives the electrical portion, which then constitutes an electricity generator, e.g. an alternator.

BACKGROUND OF THE INVENTION

This type of turbomachine is used in particular in the form of an expansion turbine or a high pressure pump in the liquefied natural gas (LNG) and the liquefied petroleum gas (LPG) industries. The fluid passing through the turbomachine is then natural gas (methane, ethane), liquefied petroleum gas (butane, propane), or a mixture thereof referred to as a refrigerant-mix (RM) (which may also include a limited quantity of heavier compounds).

A permanent objective when designing such a machine is to maximize its lifetime and performance.

For that purpose, efforts are made in particular to reduce the rotary friction of the rotor. To do this, it is essential to select appropriate means for holding the position of the rotor relative to the stator, both radially and axially. It should be observed that usually the rotor is arranged with a shaft that is disposed vertically, and a first function of the holding means is specifically to support the weight of the rotor, in particular when stationary or at low speed.

Various embodiments of holding means suitable for use in a turbomachine are disclosed in patent application US 2006/0186671.

Figure 1A:
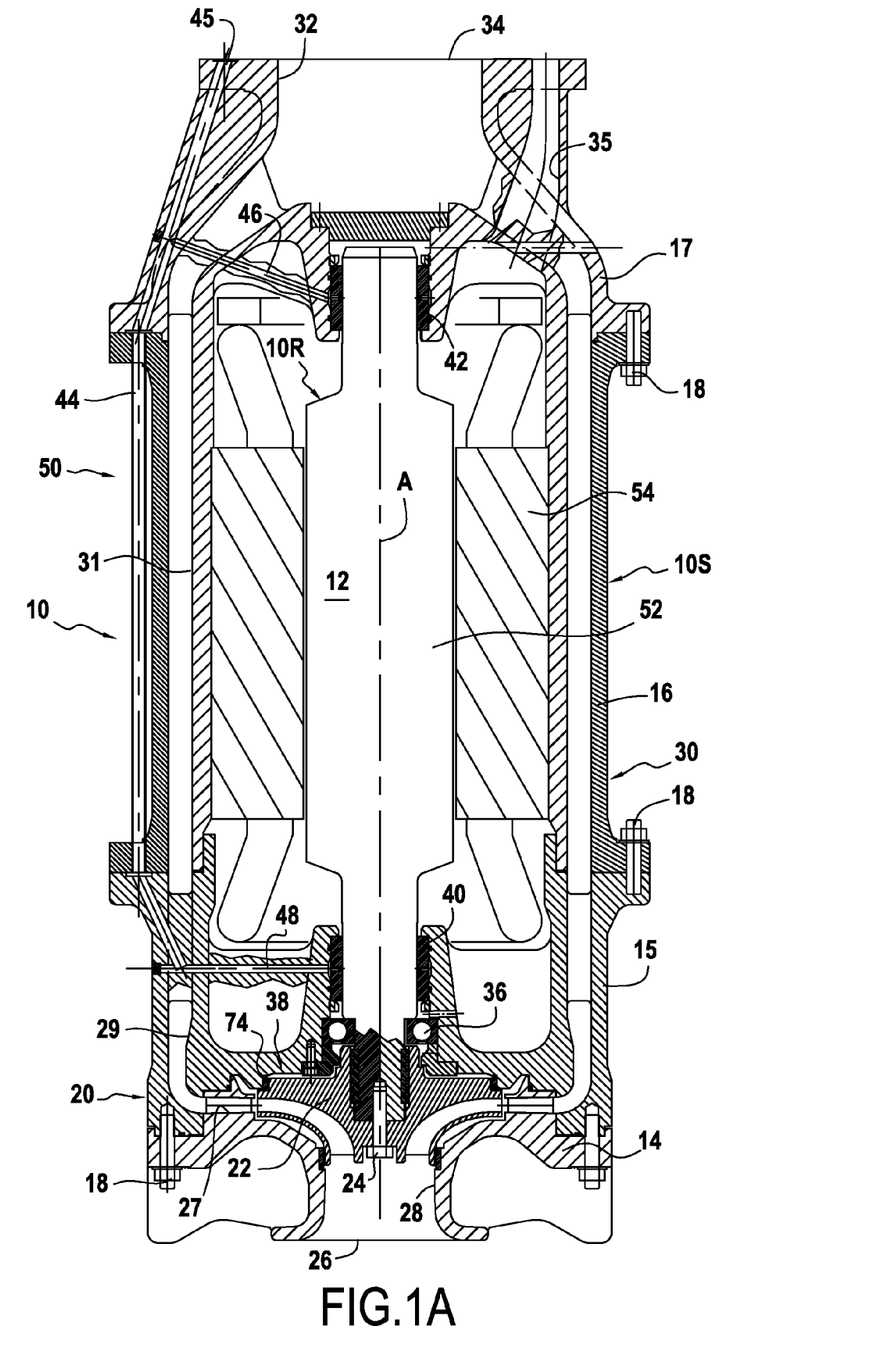
FIGS. 1A and 2A are axial section views of a turbomachine in two embodiments of the invention, for which the thrust bearing is respectively a ball bearing abutment and a hydrostatic abutment.

In a first embodiment (FIG. 1), there is disclosed a turbine generator, with its radial position being held by rolling bearings. Nevertheless, ball bearings present the drawback of involving mechanical contact and thus friction between facing surfaces, thereby leading to wear and consuming energy, in particular at high speeds of rotation; they also put a limit on the maximum acceptable speed of rotation.

Axial position is held at low speed by one of the above-mentioned ball bearings, and at high speed by an axial balancing device arranged on the back of a bladed wheel.

The above-mentioned ball bearing includes an outer ring mounted slidably relative to the stator over a limited range. At low speed, the outer ring is blocked in abutment at one end of that range, with the ball bearing thus blocking the axial position of the rotor.

At high speed, the rotor is pushed upwards by the pressure of the fluid on the bladed wheels, and the axial balancing device takes over from the ball bearing for holding the rotor in a substantially stationary position, within the above-mentioned range. The axial balancing device is incorporated in the first bladed wheel and it includes a balancing chamber disposed on the rear face of the bladed wheel, associated with a nozzle presenting axial clearance and serving to adjust the pressure in the balancing chamber so as to hold the axial position of the rotor.

The drawback of that embodiment is that the inner ring of the ball bearing (secured to the rotor) and the balls are driven to rotate by the movement of the rotor, thereby giving rise to friction and wear in the ball bearing. As a result, the lifetime of that portion of the electricity generator is limited.

To remedy those drawbacks, patent application US 2006/0186671 presents another embodiment of a turbine electricity generator (FIG. 7).

In that embodiment, in order to hold the rotor radially, the generator has declutchable ball bearings. Those ball bearings are used at low speed. They are in parallel with hydrostatic bearings that take over at high speed. The hydrostatic bearings make use of the pressure of the fluid in the main circuit of the turbomachine and they hold the radial position of the rotor as soon as the speed of rotation (and thus the fluid pressure) reaches a sufficient value. (In that document, the "main circuit" of the turbomachine means all of the circuits enabling fluid to flow through the fluid-flow portion of the turbomachine.)

In order to hold the axial position of the rotor, when stationary and at low speed, one of the ball bearings is in abutment on a conical bearing surface of the rotor shaft, thereby supporting it in the vertical direction.

At higher speed, the rotor rises a little under the effect of the fluid pressure in the bladed wheels; it is then held in position by the axial balancing device. The ball bearings are then declutched by the rotor moving in translation, thereby opening clearance relative to the conical bearing surfaces of the rotor shaft in register with the ball bearings: the bottom bearing is declutched by the rotor moving in translation (separation from the cone), whereas for the top bearing, it is the rise in fluid pressure that acts against the device incorporating the bearing in order to declutch the cone.

That arrangement has the drawback of being complicated, and above all of lacking reliability. The ball bearings are declutched because the rotor moves in translation, and this movement is of very small amplitude. In practice, since there can be no question of using a shaft of large diameter, the conicity of the bearing surface remains small, thereby giving rise to poor reliability during the declutching of the bearings and running the risk of strong interaction in operation between the ball bearings and the hydrostatic bearings.

In addition, having parallel radial holding means (ball bearings in parallel with hydrostatic bearings) leads to extra weight and to an increase in the volume of the machine.

OBJECT AND SUMMARY OF THE INVENTION

A first object of the invention is to remedy the above-mentioned drawbacks by proposing a turbomachine arranged with a rotor and a stator, the turbomachine comprising: a fluid-flow portion enabling energy to be exchanged between a fluid passing therethrough and the rotor, including in particular at least one bladed wheel mounted on a shaft of the rotor; an electrical portion suitable for converting electricity into work or vice versa; radial positioning means serving to position the rotor radially; and a contactless axial balancing device arranged on said bladed wheel, providing axial balancing for the rotor at high speed; which turbomachine consumes little fluid and presents good volumetric efficiency, is relatively compact, has a long lifetime with little wear at the interfaces for holding the rotor in position, and is suitable for operation at high speeds.

This object is achieved by the fact that the turbomachine includes a thrust bearing distinct from the radial positioning means (or radial support means), which thrust bearing provides axial balancing of the rotor at low speed, and is contactless at high speed; and the radial positioning means are constituted solely by hydrostatic bearings, the turbomachine including hydrostatic bearing feed circuits suitable for connecting said bearings to a source of fluid under pressure.

These feed circuits may be partially or completely distinct from the main fluid circuit of the turbomachine.

In this turbomachine, axial position and radial position are held by distinct means, the thrust bearing being distinct from the radial positioning means. In this way, a high performance technique can be used for making each of the two types of holding means, thereby enabling the turbomachine to be optimized: firstly a thrust bearing, associated with a contactless axial balancing device for high speeds, and secondly hydrostatic bearings for holding position radially.

It should firstly be observed that the turbomachine is designed to be placed with the shaft of the rotor in a vertical or an oblique position, but not a horizontal position. Gravity acting on the rotor constitutes a return force that limits upward axial movements of the rotor and thus contributes to holding its axial position.

Downward movements in the axial direction are limited by the thrust bearing. It supports the weight of the rotor when stationary and at low speed. Advantageously, since the thrust bearing does not have a radial position-holding function, it may be dimensioned to be of small size. Since it is contactless at high speed (above a predetermined speed), the axial abutment does not disturb the operation of the rotor at high speed, thereby advantageously making it possible to extend the operating range of the rotor up to high speeds. The thrust bearing is distinct from the axial balancing device.

At high speed, axial position is held by the axial balancing device. Advantageously, the axial balancing device is incorporated in the bladed wheel(s) and operates with the fluid flowing through the fluid-flow portion, thus making it possible to avoid pointless consumption of fluid. This incorporated configuration contributes to the turbomachine having high volumetric efficiency.

Radial position is advantageously held by a single device, specifically hydrostatic bearings. No ball bearing or other holding device that involves contact is involved in holding the radial position.

As soon as they are under fluid pressure, the hydrostatic bearings place the rotor in a position in which it presents a very small amount of clearance (a few tens of micrometers) between the rotor and the bearings. These bearings thus make it possible to obtain friction losses that are extremely low, and this is achieved without requiring mechanical members to be moved between the rotor and other parts that are not secured to the rotor.

In addition, since the hydrostatic bearings have their own feed circuits enabling them to be fed while the rotor is stationary or turning at low speed, they can be used for positioning the rotor radially regardless of its speed of rotation, unlike the hydrostatic bearings in parallel with ball bearings in the above-mentioned prior art. The hydrostatic bearings thus serve to hold the radial position of the rotor at all speeds of the turbomachine.

More particularly when the turbomachine is used with a fluid at low or very low pressure (as applies with LNG or LPG or RM), the use of an external source of fluid under pressure in association with feed circuits for the hydrostatic bearing, makes it possible, as a priority, to reduce the temperature of zones having very small clearance and situated in the core of the machine, and also makes it possible to have accurate control over temperature at the bearings. Since the radial clearance in a bearing is very small, there is often a risk of a hydrostatic bearing jamming during the drop in temperature on starting. Controlling the temperature of the bearing feed fluid enables this risk to be reduced and kept under control.

By means of the invention, the interfaces for holding the rotor in position are contactless at high speed, above some predetermined speed. (The term "with contact" is used herein to mean that there is mechanical contact between two solids.) These interfaces are the mechanical interfaces between the rotor and the remainder of the machine, at the radial positioning means, the thrust bearing, and the axial balancing device.

Thus, at high speed, a fluid film separates the rotor from the portions of the machine that are not secured to the rotor; there is no mechanical contact between a surface of the rotor and a surface of some other portion that is not secured to the rotor. As a result, friction losses and wear are minimized.

In an embodiment, the thrust bearing includes bearing surfaces forming an angle of more than 10° relative to the axis of the rotor, and preferably close to 90°. As a result, any risk of the thrust bearing jamming and of interaction between the thrust bearing and the hydrostatic bearings is avoided.

Two embodiments can be envisaged in particular for the thrust bearing.

In a first embodiment, the thrust bearing is a hydrostatic bearing. This embodiment is found to be attractive for ensuring accurate positioning, in a very long-lasting manner, as with the hydrostatic bearings for holding radial position. The feed circuits for the hydrostatic bearings acting axially and radially may be common in part, but the functional surfaces (bearing surfaces) thereof nevertheless remain distinct.

In a second embodiment, the thrust bearing is a ball bearing. This ball bearing is designed to be contactless at high speeds of rotation.

By way of example, to achieve this, the ball bearing comprises an inner ring having a radially inside surface that is substantially cylindrical, with clearance being formed between said surface and an outside surface of the rotor. Because of this radial clearance, no portion of the ball bearing is driven in rotation while the rotor is rotating. As a result, rotor wear and risk of malfunction are minimized. In contrast, the surfaces at the axial ends of the bearing are required to transmit forces to perform the thrust bearing function.

In an embodiment, the turbomachine further includes a filter upstream in the hydrostatic bearing feed. By means of this, any large-diameter particles that might damage the hydrostatic bearings are eliminated upstream therefrom, thereby increasing bearing lifetime.

In an embodiment, at high speed, the axial balancing device makes use solely of the fluid flowing through the bladed wheel(s) for the purpose of holding the rotor axially in position. This optimizes the volumetric efficiency of the turbomachine, and the structure of the axial balancing device remains simple.

A second object of the invention is to provide a turbomachine device including a turbomachine of the type previously defined and presenting, in particular at high speed, volumetric efficiency that is high, a lifetime that is long, and including internal means for feeding hydrostatic bearings of the turbomachine with fluid under pressure.

This object is achieved by the fact that the device comprises both a turbomachine as described above, suitable for being connected to a source of fluid under pressure, and means for selecting the feed to the hydrostatic bearings of the turbomachine, said feed being either said source of fluid under pressure, or a main fluid circuit of the turbomachine.

Thus, because of the possibility of selecting the source of fluid under pressure, it is possible to minimize the more penalizing consumption of fluid (i.e. in practice, minimizing the length of time the machine operates using the external fluid source). The source of fluid under pressure may be a fluid tank, with a compressor suitable for compressing the fluid to the required pressure. It may equally be a fluid buffer that is substantially full of fluid under pressure when stationary, suitable for delivering a given quantity of fluid at the required pressure in order to start the turbomachine; the buffer being refilled as soon as the turbomachine has started.

By optimizing the choice of source of fluid under pressure for the hydrostatic bearings, the overall energy efficiency of the turbomachine is optimized.

BRIEF DESCRIPTION OF THE DRAWINGS

The invention can be well understood and its advantages appear better on reading the following detailed description of embodiments given as non-limiting examples. The description refers to the accompanying drawings, in which.

MORE DETAILED DESCRIPTION

When an element appears in more than one figure, it retains the same reference in the various figures, and it is described with reference to the first figure in which it appears.

With reference to FIG. 1, a turbomachine of the invention is described below.

The turbomachine 10 is an electricity generator that is driven by a turbine. It comprises a fluid-flow portion 20, constituted by a turbine, and an electrical portion 50, constituting an electricity generator.

The turbomachine 10 is arranged in the form of a rotor 10R rotating about its shaft 12 in a stator 10S.

The stator 10S essentially comprises a casing 30 made of four portions 14, 15, 16, and 17. These portions are stationary and fastened to one another by screws 18. The stator also includes the stationary or stator portion 54 of the electricity generator.

The rotor 10R essentially comprises a bladed wheel 22 fastened to one end of the shaft 12 by a screw 24, by the rotor shaft 12 itself, and by the rotor portion 52 of the electricity generator 50 (the larger-diameter central portion on the shaft 12 as shown in FIG. 1, and not shown in detail in the figure).

The turbomachine 10 operates as follows.

The fluid under pressure penetrates into the turbomachine 10 via an orifice 34, pierced in the casing portion 17 on the axis of the shaft 12.

It is guided by the passage 32 of the casing 17, the passage 31 of the casing 16, the passage 29 of the casing 15, and the integrated passage 27 (blades integrated in the casing 14 upstream from the wheel) of the casing 14 as far as the bladed wheel 22, through which it passes between the blades, thereby driving it in rotation. The rotor 10R is thus set into rotation under the action of the fluid.

The electricity generator 50 with its rotor portion 52 on the rotor and its stator portion 54 is a known turbomachine component. Under the effect of the rotation of the rotor 10R, it delivers electricity that is conveyed by cables (not shown) passing through the passage 35.

After passing through the bladed wheel 22, the fluid passes via a passage 28 of the casing 14 that guides it to an outlet orifice 26 arranged in the casing portion 14 at the end of the turbomachine remote from the inlet orifice 34.

The rotor 10R is held (axially and radially) in position as follows:

It should firstly be observed that the turbomachine 10 is designed to function in a vertical configuration, i.e. with the axis of the rotor in a vertical direction.

Figure 1B:
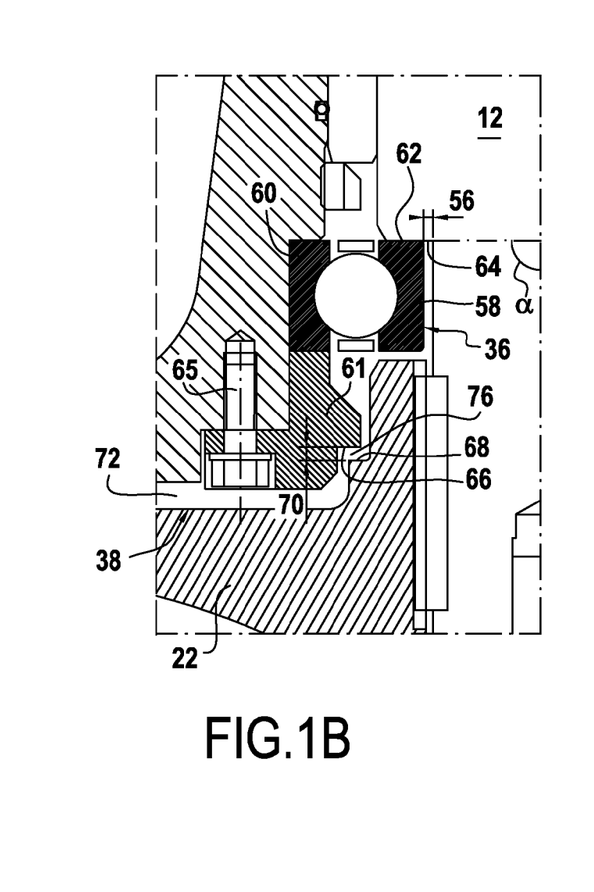
FIGS. 1B and 1C are axial sections of the first embodiment of the turbomachine in the vicinity of the thrust bearing and of the axial balancing device, respectively at low speed and at high speed.
Figure 1C:
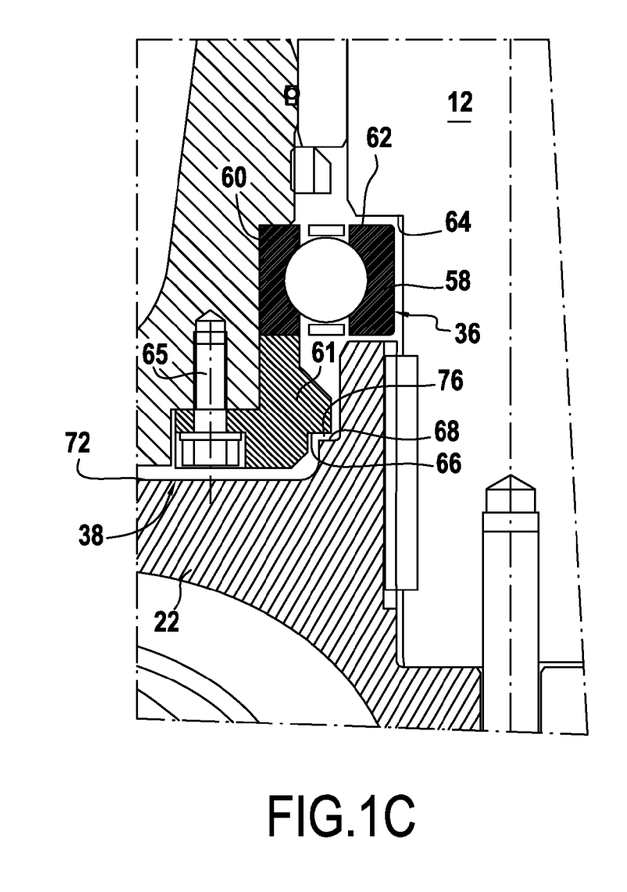

To support the weight of the rotor, which thus acts along the axis A of the rotor shaft 12, the turbomachine includes a thrust bearing constituted by a rotary bearing 36, specifically a ball bearing. When stationary and at low speeds of rotation of the rotor, the ball bearing 36 supports the weight of the rotor 10R. When the speed of rotation of the rotor rises, the rotor 10R rises slightly and its position is then regulated by an axial balancing device 38 formed at the rear of the bladed wheel 22. The arrangement of these elements is described in detail with reference to FIGS. 1B and 1C.

The rotor is positioned radially by the hydrostatic bearings 40 and 42. These hydrostatic bearings have feed circuits 44, 46, 48 that are distinct from the main fluid circuits 29, 31. The feed orifice 45 for these circuits is designed to be connected to a source of fluid under pressure. The turbomachine 10 may also include a filter (not shown) disposed upstream from the hydrostatic bearings, and designed to eliminate any particles of too large a diameter that might be present in the fluid.

In known manner, each of these hydrostatic bearings 40, 42 comprises a sleeve-shaped portion surrounding a cylindrical bearing surface of the shaft 12 with very little clearance. The bearing feed fluid is injected between the sleeve-shaped portions and the shaft 12 so as to form a thin film, separating the shaft from the bearing and enabling the shaft to rotate without mechanical friction, keeping the shaft 12 in the desired radial position.

The operation of the axial holding means is described below in detail with reference to FIGS. 1B and 1C. FIG. 1B shows the rotor in the position it occupies at low speeds of rotation, whereas FIG. 1C shows it in the position it occupies at high speeds of rotation. It should firstly be observed that there is internal clearance 56 between the internal ring 58 of the ball bearing 36 and the shaft 12. As a result of this clearance 56, the bearing 36 is driven in rotation only while it is supporting the weight of the rotor 10R. A top surface 62 of the ring 58 is then in contact with a shoulder 64 of the shaft 12. The functional or bearing surfaces of the thrust bearing 36 form an angle $\alpha$ of 90° relative to the axis A of the rotor 10R.

At the outside of the ball bearing 36, the outer ring 60 transmits the weight of the rotor to the annulus 61 secured to the casing portion 15 and fastened thereto by screws 65.

At high speeds of rotation (FIG. 1C), the rotor 10R rises up the axis A. The surface 62 of the ring 58 is no longer in contact with the shoulder 64 of the shaft 12. The ball bearing 36 is not driven in rotation and it performs no function.

The axial balancing device 38 is shown in the bottom portions of FIGS. 1B and 1C. A chamber 72 is formed behind the bladed wheel 22, beside the rotor 10R. A small amount of fluid is bled from the main circuit of the turbomachine via the constant section nozzle 74 and it fills the chamber 72. Fluid is exhausted from said chamber via a nozzle 76 formed between the surfaces 66 and 68 respectively of the annulus 61 and of the bladed wheel 22. The annular surface 66 extends radially substantially facing the corresponding annular surface 68 of the bladed wheel 22. Between these two surfaces there is formed clearance 70. The clearance 70 varies as a function of the axial position of the rotor relative to the stator so as to regulate the pressure in the chamber 72, and finally, the fluid pressure in the chamber 72 acts (in known manner) on the bladed wheel 22 and thus on the rotor 10R so as to hold it in an axial position that is substantially constant.

Figure 2A:
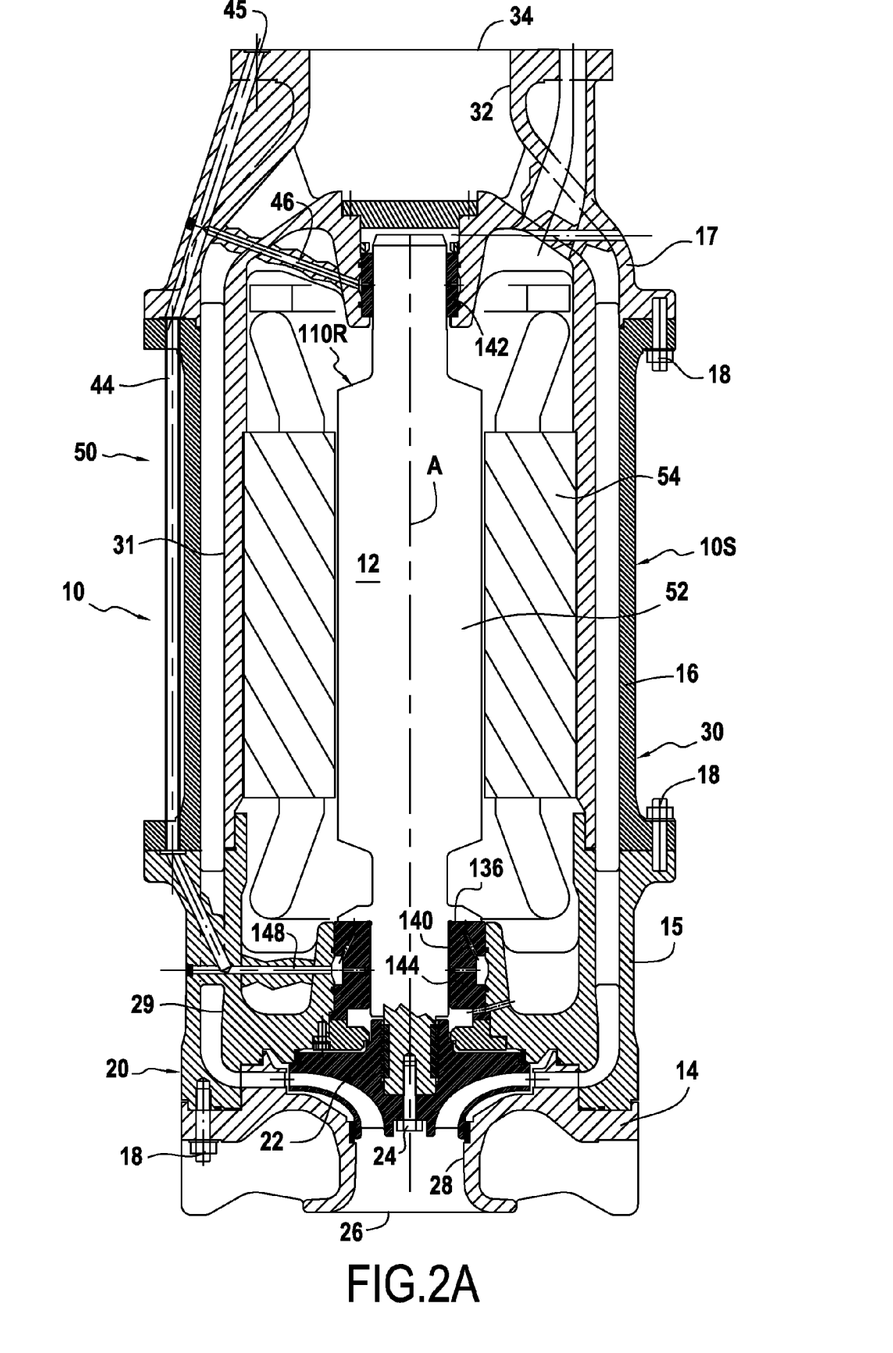

A second embodiment is described with reference to FIGS. 2A, 2B, and 2C. The function and the structure of the turbomachine shown in these figures are substantially identical to those of the turbomachine described with reference to FIGS. 1A to 1C.

The radial positioning of the rotor 110R is provided by two hydrostatic bearings 140 and 142 disposed substantially at the ends of the rotor.

In contrast, the means for holding the rotor 110R in its axial position are different from those of the above-described embodiment. When stationary and at low speeds of rotation, the rotor 110R is supported by a thrust bearing constituted by a hydrostatic thrust bearing 136. This bearing is adjacent to the hydrostatic bearing 140 for holding the radial position, such that these two components are advantageously made using a common ring 144 that is fastened in the casing portion 115. Nevertheless, the functional surfaces of the components 136 and 140 are distinct surfaces, having normals that are directed respectively axially and radially, and the thrust bearing 136 is distinct from the hydrostatic bearing 140 for holding radial position.

Because of the hydrostatic thrust bearing 136, as soon as fluid pressure is applied to the orifice 45, the rotor rises a very small amount and it can begin to turn.

Figure 2B:
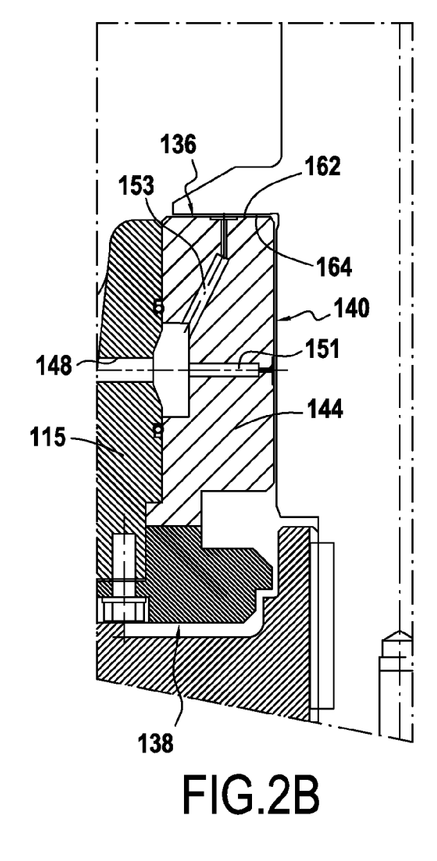
FIGS. 2B and 2C are axial sections of the second embodiment of the turbomachine in the vicinity of thrust bearing and the axial bearing device, respectively at low speed and at high speed.
Figure 2C:
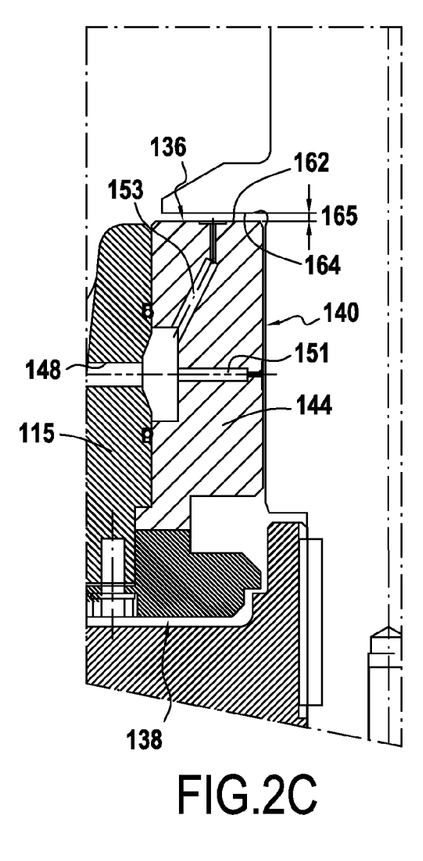

As shown in FIGS. 2B and 2C, the operation of the hydrostatic thrust bearing 136, compared with the axial balancing device 38, is very similar to that of the turbomachine in the above-described embodiment.

Ducts 148 convey a fluid under pressure into distribution ducts 151 and 153 that convey the fluid respectively to the hydrostatic thrust bearing 136 and to the hydrostatic bearing 140. The ducts 148, 151, and 153 are regularly spaced apart all around the circumference of the casing portion 115 and of the ring 144 so as to distribute the fluid all around the circumference.

When stationary and at low speed, the rotor 110R is lifted off the ring 144 under the effect of the fluid pressure in the hydrostatic thrust bearing 136, and it takes up a position close to the top portion 162 thereof. A very small amount of clearance is thus formed between said surface 162 and the facing surface 164 of the rotor 110R, thereby avoiding any mechanical friction between the rotor 110R and the stator.

At higher speed, the axial balancing device 138 lifts the rotor a little (relative to its position when stationary or at low speed), thereby increasing the axial clearance 165 between the surfaces 162 and 164. The hydrostatic thrust bearing 136 is then declutched, and the axial position of the rotor 110R is held solely by the axial balancing device 138.

This arrangement is found to be simultaneously very compact, simple, and inexpensive since the axial thrust bearing (the hydrostatic thrust bearing 136) is made in part out of the means constituting the hydrostatic bearing 140.

Figure 3A:
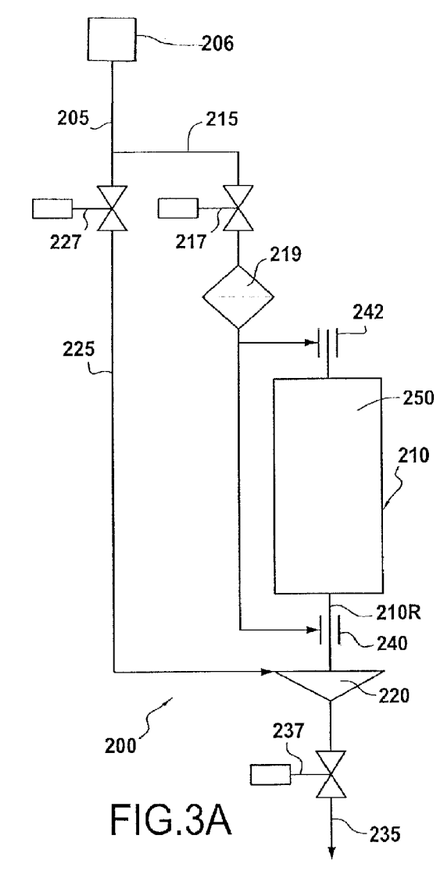
FIGS. 3A and 3B are diagrams showing two turbomachine devices in accordance with the invention, respectively including a turbine-driven electricity generator and an electrically-driven turbine pump.
Figure 3B:
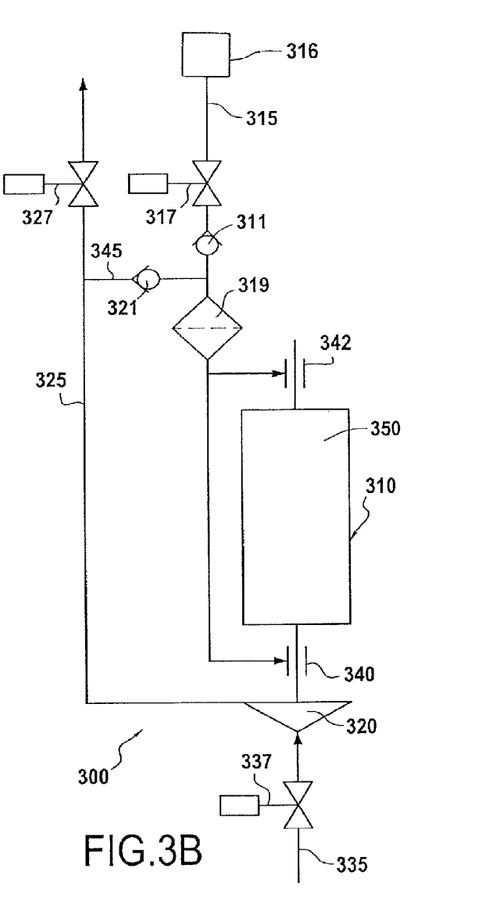

FIGS. 3A and 3B show two turbomachine devices of the invention.

The first device 200 (FIG. 3A) includes a turbomachine 210 that comprises an electricity generator 250 driven by a turbine 220. The turbomachine rotor 210R is held in radial position by two hydrostatic bearings 240 and 242.

The turbine 220 and the hydrostatic bearings 240 and 242 are fed from a source 206 of fluid under pressure through a single pipe 205.

A first pipe 215, with flow rate controlled by a valve 217, is connected to the pipe 205 to feed the hydrostatic bearings via a filter 219.

A second pipe 225 is also connected to the pipe 205 to feed the turbine 220. The flow of fluid through the turbine 220 is controlled by two valves 227 and 237 that are situated respectively upstream in the pipe 225 and in the fluid exhaust pipe 235 downstream from the turbine 220.

FIG. 3B shows a turbomachine device 300 of the invention for a turbomachine that constitutes an electric pump. The device 300 includes a turbomachine 310 with an electric motor 350 driving a pump 320. Except where specified otherwise, elements analogous to those of FIG. 3A are given the same numerical references plus 100.

The hydrostatic bearings 340 and 342 are fed by a pipe 315 via a filter 319, which pipe is suitable for being connected to a source 316 of fluid under pressure external to the turbomachine device 300. The flow rate in this pipe is controlled by a valve 317.

The pump 320 is fed via a pipe 335. The feed flow rate is controlled by a valve 337. Delivery from the pump takes place via a pipe 325 in which flow rate is controlled by a valve 327.

In addition, a pipe 345 connects the pipe 325 to the pipe 315.

A check valve 321 is located in the pipe 345 to prevent fluid returning via the pipe 325, and another check valve 311 is disposed in the pipe 315 to prevent fluid returning towards the source of fluid under pressure (not shown). As a result of these two check valves, the hydrostatic bearings 340, 342 have applied thereto the greater of the pressures constituted by the delivery pressure from the pump 320 (pressure in the pipe 325) and the pressure at the outlet from the source of fluid under pressure. Consequently, as soon as the pump delivery pressure is high enough, the consumption of fluid under pressure from the external source of fluid under pressure is interrupted.

Another embodiment would consist in providing a controlled changeover device, e.g. using an electronic control unit, to select the origin of the fluid under pressure that feeds the hydrostatic bearings.

What is claimed is:

1. A turbomachine arranged with a rotor and a stator, the turbomachine comprising:
   a fluid-flow portion enabling energy to be exchanged between a fluid passing therethrough and the rotor, including at least one bladed wheel mounted on a shaft of the rotor;
   an electrical portion suitable for converting electricity into work or vice versa;
   radial positioning device configured to position the rotor radially; and
   a contactless axial balancing device arranged on said bladed wheel, providing axial balancing for the rotor at high speed;
   wherein:
   the turbomachine further comprises a thrust bearing distinct from the radial positioning device, which thrust bearing provides axial balancing of the rotor at low speed, and is contactless at high speed; and the radial positioning device is constituted solely by hydrostatic bearings to comprise the sole radial positioning device, the turbomachine including hydrostatic bearing feed circuits suitable for connecting said bearings to a source of fluid under pressure.

2. The turbomachine of claim 1, wherein the thrust bearing includes bearing surfaces forming an angle of more than 10° relative to the axis of the rotor.

3. The turbomachine of claim 1, wherein the thrust bearing is a hydrostatic bearing.

4. The turbomachine of claim 1, wherein the thrust bearing is a ball bearing.

5. The turbomachine of claim 4, wherein the ball bearing comprises an inner ring having a radially inside surface that is substantially cylindrical, with clearance being formed between said surface and an outside surface of the rotor.

6. The turbomachine of claim 1, further including a filter upstream in the hydrostatic bearing feed.

7. The turbomachine of claim 1, wherein the fluid-flow portion comprises a pump, and the electrical portion is an electric motor.

8. The turbomachine of claim 1, wherein the fluid-flow portion is a turbine, and the electrical portion is an electricity generator.

9. The turbomachine of claim 1, wherein at high speed, the axial balancing device makes use solely of the fluid flowing through the bladed wheel(s) for the purpose of holding the rotor axially in position.

10. The turbomachine of claim 1, wherein the fluid passing through the turbomachine comprises LNG, LPG, or a refrigerant mix fluid.

11. The turbomachine device comprising both a turbomachine according to claim 1, suitable for being connected to a source of fluid under pressure, and a changeover device configured to select the feed to the hydrostatic bearings of the turbomachine, said feed being either said source of fluid under pressure, or a main fluid circuit of the turbomachine.

12. A turbomachine device comprising both the turbomachine of claim 2, suitable for being connected to a source of fluid under pressure, and a changeover device configured to select the feed to the hydrostatic bearings of the turbomachine, said feed being either said source of fluid under pressure, or a main fluid circuit of the turbomachine.

13. A turbomachine device comprising both the turbomachine of claim 3, suitable for being connected to a source of fluid under pressure, and a changeover device configured to select the feed to the hydrostatic bearings of the turbomachine, said feed being either said source of fluid under pressure, or a main fluid circuit of the turbomachine.

14. A turbomachine device comprising both the turbomachine of claim 4, suitable for being connected to a source of fluid under pressure, and a changeover device configured to select the feed to the hydrostatic bearings of the turbomachine, said feed being either said source of fluid under pressure, or a main fluid circuit of the turbomachine.

15. A turbomachine device comprising both the turbomachine of claim 5, suitable for being connected to a source of fluid under pressure, and a changeover device configured to select the feed to the hydrostatic bearings of the turbomachine, said feed being either said source of fluid under pressure, or a main fluid circuit of the turbomachine.

16. A turbomachine device comprising both the turbomachine of claim 6, suitable for being connected to a source of fluid under pressure, and a changeover device configured to select the feed to the hydrostatic bearings of the turbomachine, said feed being either said source of fluid under pressure, or a main fluid circuit of the turbomachine.

17. A turbomachine device comprising both the turbomachine of claim 7, suitable for being connected to a source of fluid under pressure, and a changeover device configured to select the feed to the hydrostatic bearings of the turbomachine, said feed being either said source of fluid under pressure, or a main fluid circuit of the turbomachine.

18. A turbomachine device comprising both the turbomachine of claim 8, suitable for being connected to a source of fluid under pressure, and a changeover device configured to select the feed to the hydrostatic bearings of the turbomachine, said feed being either said source of fluid under pressure, or a main fluid circuit of the turbomachine.

19. A turbomachine device comprising both the turbomachine of claim 9, suitable for being connected to a source of fluid under pressure, and a changeover device configured to select the feed to the hydrostatic bearings of the turbomachine, said feed being either said source of fluid under pressure, or a main fluid circuit of the turbomachine.

20. A turbomachine device comprising both the turbomachine of claim 10, suitable for being connected to a source of fluid under pressure, and a changeover device configured to select the feed to the hydrostatic bearings of the turbomachine, said feed being either said source of fluid under pressure, or a main fluid circuit of the turbomachine.

* * * * *